May 10, 1955  G. L. N. MEYER  2,708,021
CONVEYORS
Filed Aug. 28, 1950  5 Sheets-Sheet 1

Inventor:
Geo. L. N. Meyer
By Eugene N. Simpson
Attorney.

May 10, 1955  G. L. N. MEYER  2,708,021
CONVEYORS

Filed Aug. 28, 1950  5 Sheets-Sheet 3

Inventor
Geo. L. N. Meyer
By: Eugene N. Simpson
Attorney

Inventor:
Geo. L. N. Meyer.

United States Patent Office 2,708,021
Patented May 10, 1955

2,708,021
CONVEYORS
George L. N. Meyer, Milwaukee, Wis.
Application August 28, 1950, Serial No. 181,709
8 Claims. (Cl. 198—30)

This invention relates to conveyors and more particularly to a conveyor of the multi-line type.

In machines made to unload cases of empty bottles prior to washing the bottles, the usual case unloader removes all the bottles from the case simultaneously and deposits them on a conveyor in the same pattern they occupied in the case. That is, the bottles would then be arranged in either four or six lines. The bottles, however, must be fed to the bottle washer, or other bottling machine, in single lines.

It is an object of the invention to provide a multi-line conveyor for containers which will deliver the containers in a single line.

Another object is to provide a transverse conveyor adapted to move containers from a multi-line conveyor in single lines.

A further object is to provide a conveyor which will reduce the cost of handling containers in a bottling plant.

A still further object is to increase the efficiency of bottle conveyors.

Still further objects will become apparent upon considering the following specification, which, when taken in conjunction with the accompanying drawings, illustrates a preferred form of the invention.

Figure 1:
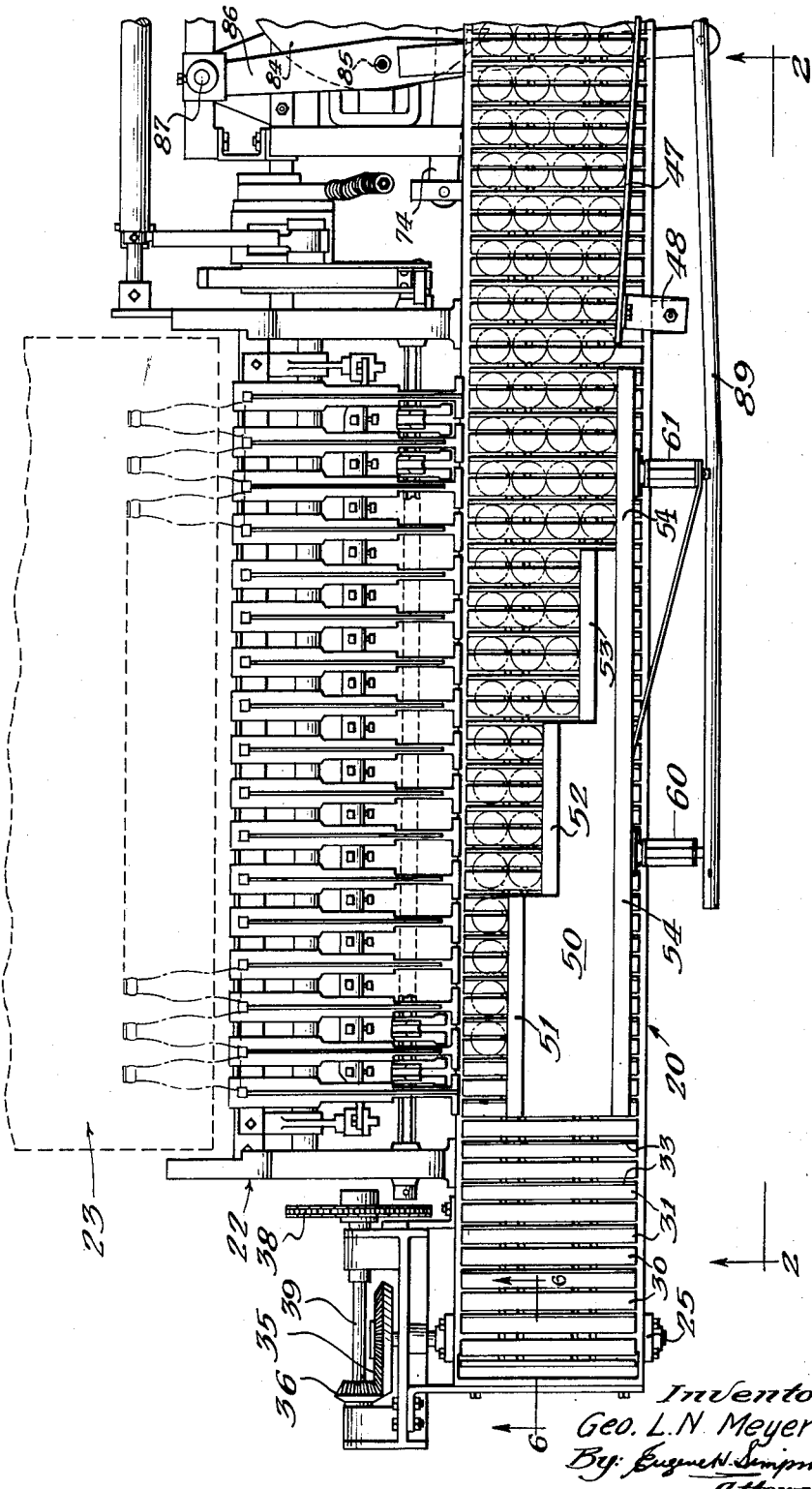
Fig. 1 is a plan view of a portion of a conveyor, embodying the present invention, showing its use in connection with a bottle washer.

Referring to the drawings, a conveyor, generally designated 20 is shown. The conveyor 20 (Fig. 1) is adapted to be loaded by a case unloader (not shown) which picks all the bottles directly from the case simultaneously, and deposits them on the conveyor 20 at the loading end of the conveyor shown in Fig. 3, in the same general pattern as they occupied in the case. Thus the bottles are deposited in four lines with six bottles in each line.

The conveyor 20 transmits the bottles in the four lines toward the loading tray 22 of a bottle washer 23.

Figure 6:
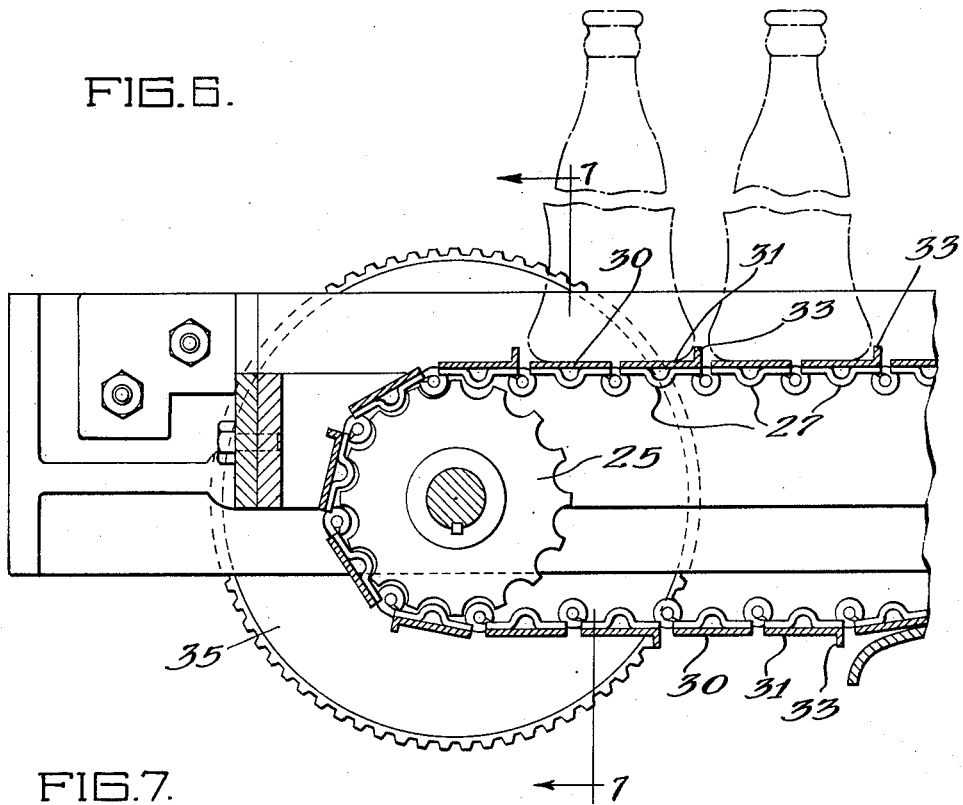
Fig. 6 is an enlarged cross-sectional view of the forward end of the conveyor and is a view taken on the line 6—6 of Fig. 1, looking in the direction of the arrows.

The conveyor, which has been generally designated as 20, is carried between a pair of sprocket wheels 25 and 26 located at the opposite ends of the conveyor. The conveyor chain comprises a plurality of links 27 (Fig. 6) which pass around the wheels 25 and 26 and are driven thereby. The links 27 each have conveyor plates 30 or 31 attached thereto which carry the bottles as they leave the case unloader to the bottle washing machine 23 or other point of use.

The plates 30 comprise narrow flat plates substantially one-half the diameter of the bottle being handled. The plates 31 are similar to the plates 30 in size but have an upstanding flange 33 on the trailing edge thereof to form a guide for the bottles and keep them in parallel rows during the period the bottles remain on the conveyor 20.

As was the case with the plates 30, the plates 31 are also approximately half the width of the diameter of a bottle so that one plate 30 and one plate 31 co-operate to support the bottles.

Figure 2:
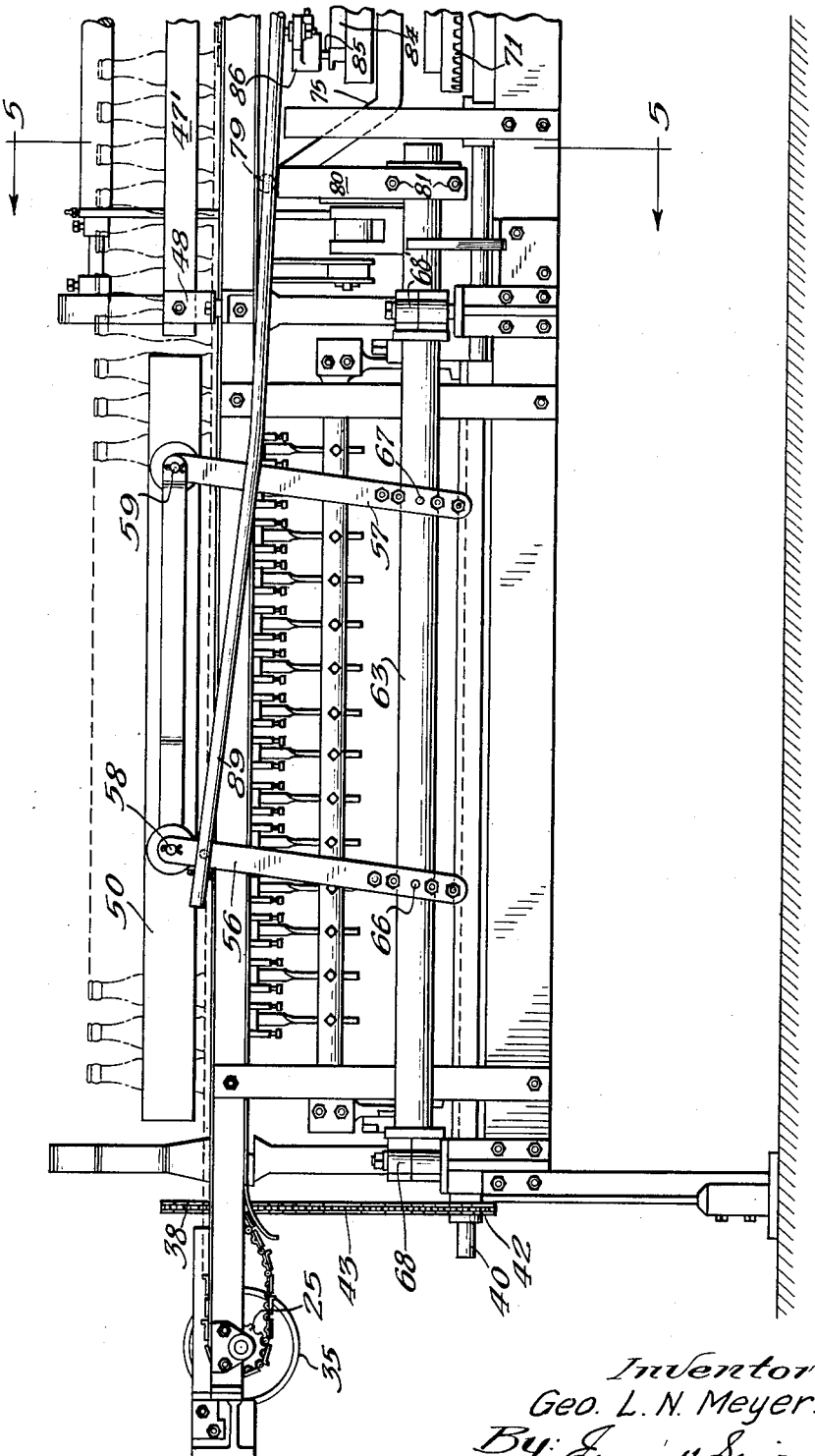
Fig. 2 is an elevational view of that part of the conveyor shown in Fig. 1, and is a view taken on the line 2—2 of Fig. 1.
Figure 3:
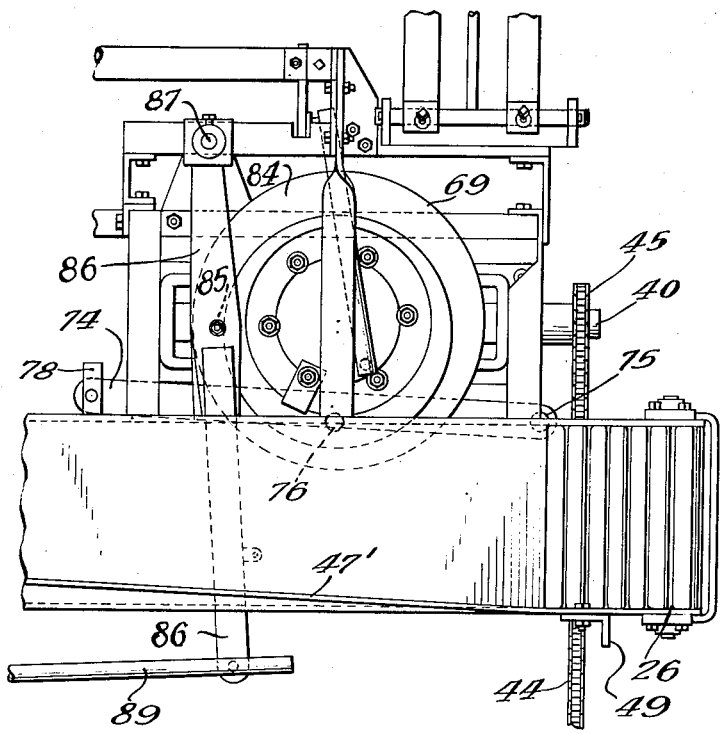
Fig. 3 is a plan view of the right hand end of the conveyor, shown in Fig. 1, and is a continuation of that figure.
Figure 4:
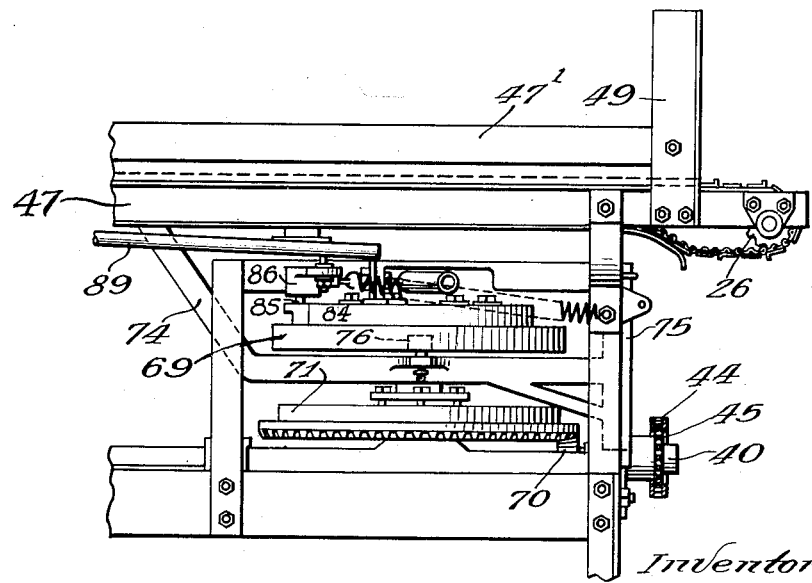
Fig. 4 is a front elevational view of that portion of the conveyor shown in Fig. 3.

The conveyor 20 is driven by the sprocket wheel 25, which is driven by a pair of bevel gears 35—36 (Figs. 1 and 2). The gears 35—36 are driven by a sprocket wheel 38 which is keyed on a shaft 39 with the gear 36. The sprocket wheel 38 is driven from a shaft 40 through a second sprocket wheel 42 and chain 43 (Fig. 2). The shaft 40 is driven from a motor (not shown) through a chain 44 and sprocket wheel 45 (Fig. 3).

Figure 7:
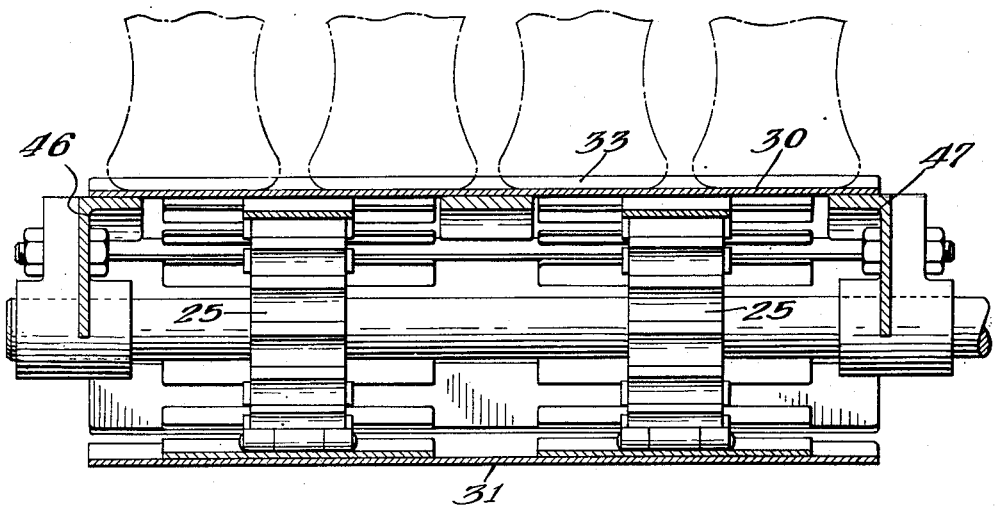
Fig. 7 is a cross-section taken on the line 7—7 of Fig. 6, looking in the direction of the arrows.

The sprocket wheels 25 and 26 are mounted on a frame comprising a pair of angle irons 46 and 47 (Fig. 7), which extend the length of the machine and support the plates 30 and 31 in their forward flight. The angle irons 46 and 47 are supported from the frame of the bottle washer 23 and by the legs thereof or by other suitable means.

When the bottles are deposited on the conveyor 20, they are in the same relative positions they occupied in the case, and hence are separated slightly due to the partitions in the case.

As the conveyor 20 advances the bottles they encounter a wedge guide 47' which forces the bottles toward one side of the conveyor as they are advanced, and so brings the bottles into contact with each other. The guide 47' is supported above the conveyor 20 and between brackets 48 and 49 both of which may be secured to the angle 46.

The bottles, advancing on the conveyor 20 in four contacting lines past the guide 47', are moved off the conveyor 20 and onto the loading tray 22 by a transverse conveyor or pusher bar, generally designated 50. The pusher bar 50 (Fig. 1) is made in four steps 51, 52, 53 and 54, corresponding to the four lines of bottles across the width of the conveyor 20.

In the machine as shown, each of the four steps 51, 52, 53 and 54, is adapted to act on four bottles and to move those four bottles at right angles to the direction of motion of the conveyor at the same time that the conveyor is advancing.

The pusher bar 50 is pivotally connected to a pair of arms 56 and 57 through pivots 58, 59, the pusher bar 50 being spaced from the ends of the arms 56 and 57 by sleeves 60—61. The arms are substantially vertical and are pivotally connected to a shaft 63 by a saddle including the brace 65 (Fig. 5) and pivots 66—67. The pivots 66—67 are parallel to the pivots 58—59 so that the pusher bar 50 always remains parallel to the shaft 63.

The shaft 63 is rocked in its bearings 68 and 68' by a cam 69 (Fig. 3). The cam is rotated at constant speed by the motor (not shown) through the chain 44, the sprocket 45 and the shaft 40. The shaft 40 has a bevel gear 70 keyed thereon which turns a bevel gear 71 which is keyed on a shaft with the cam 69.

A lever 74 is pivoted on a vertical axis 75. The lever 74 carries a cam follower 76 which engages the inside surface of the cam 69 to move the lever back and forth. The lever 74 is connected to a link 78 the other end of which is joined by a ball and socket joint 79 to a yoke 80. The yoke 80 is clamped on the shaft 63 by bolts 81 so that movement of the link 78 back and forth causes rocking of the shaft 63.

The rocking movement of the shaft 63 is transmitted to the pusher 50 causing a substantially reciprocating motion of the pusher bar 50 transversely across the conveyor 20 to shift the containers of each line, which are opposite the pusher bar, one line forward and discharge the outer line off the conveyor 20 in a line parallel to the lines remaining on the conveyor.

As the pusher bar 50 is moving transversely to the direction of travel of the conveyor 20 a second cam 84 acts on a cam follower 85 to cause a lever 86, to which the follower 85 is attached, to oscillate about a pivot 87 (Figs. 1 and 3). The outer end of the lever 86 is connected to a link 89 which joins the lever 86 with the upper end of the arm 56 to move the pusher bar 50 parallel to the movement of the conveyor at the same time that the rocking movement of the shaft 63 is moving the pusher bar 50 transversely to the conveyor.

The forward speed of the pusher bar during oscillation is equal to the speed of the conveyor so that there is no relative forward movement between the bottles and the pusher bar.

The cams 69 and 84 are so arranged and co-ordinated that at each oscillation of the rocker shaft 63, the bottles contacted by the pusher bar 50 are moved one line nearer the loading tray 22.

The cam 84 is so arranged to move the pusher bar 50 forward at the same speed as the conveyor so that there is no possibility of the bottles becoming jammed in the corners of the pusher bar 50.

The containers are moved off the conveyor 20 in single lines parallel to the lines on the conveyor onto the tray 22 of the bottle washer 23. As the bottles are moved onto the tray they are tipped on their sides and advanced by pusher fingers 90 into the pockets of the bottle washer 23 which convey the containers through the machine and wash them.

*Operation*

In operation, the bottles are delivered to the conveyor 20 from a case unloader, the bottles being delivered to the conveyor in six rows of four lines each. The bottles are retained in the rows by the upstanding edges 33 on the plates 31. As the containers advance on the conveyor 20 at constant speed the lines are moved into contact with each other by the wedge guide 47'.

Figure 5:
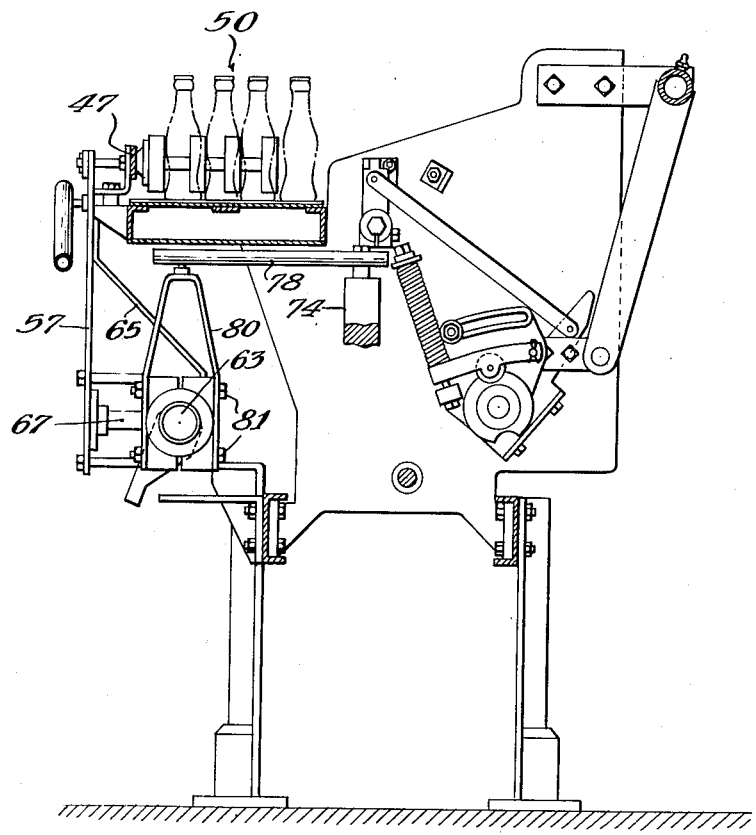
Fig. 5 is a cross-sectional view taken on the line 5—5 of Fig. 2, looking in the direction of the arrows.

As the bottles reach the pusher bar 50 they are advanced by the conveyor 20 to fill the space in front of the first step 54 of the pusher bar. When the bottles substantially fill the first step 54 of the pusher bar, the cam 69 acts on the cam follower to move the lever 74 to the rear as shown in Fig. 3. As seen in Fig. 5 the lever 74 reciprocates the lever 78 to rock the yoke 80 to oscillate the shaft 63.

Oscillation of the shaft 63 causes the pusher bar 50 to reciprocate transversely to the direction of motion of the conveyor 20.

The movement of the pusher bar 50 is equal to the width of a line of bottles so that the various steps 51, 52, 53 and 54 each move all the lines in front of them forward one line and discharge the forward line of containers (the line adjacent the bottle washer 23) in a line parallel to the lines on the conveyor 20.

As the pusher bar 50 returns to its retracted position the conveyor 20 continues to move the bottles forward thus filling the spaces vacated by the transverse movement of the pusher bar 50.

As the pusher bar 50 is being reciprocated transversely by the cam 69 and follower 76, the cam 85' and follower 85 reciprocate the lever 82, which reciprocating motion is transmitted to the pusher bar 50 through the connecting member 89, causing the pusher bar to reciprocate longitudinally of the conveyor 20.

The cams 69 and 84 are so arranged and co-ordinated with the motion so that the forward longitudinal movement of the pusher bar is substantially equal to the speed of the conveyor and the transverse movement forward occcurs when each of the steps are completely filled with bottles.

While the drawings show the conveyor as used in connection with a bottle washer, and transporting glass containers or bottles, it is obvious that this conveyor could be used with equal facility with any other machinery such as a pasteurizer, and with other types of containers, such as cans.

It will be realized that the hereinbefore described form of the invention is to be taken merely as a preferred embodiment thereof and that various changes in size, shape and arrangement of parts may be made without departing from the spirit of the invention or the scope of the subjoined claims.

That which is claimed as new and is desired to be secured by United States Letters Patent is:

1. In a machine of the character described, a first conveyor adapted to transport a plurality of lines of containers, a transverse conveyor movable across said first named conveyor and comprising a plurality of steps, each step being adapted to advance all lines opposite that step one line and to discharge the last line off said first named conveyor, and means to actuate said conveyors.

2. In a machine of the character described, a conveyor adapted to transport containers in a plurality of substantially parallel lines longitudinally of the conveyor, means to retain the transported containers in transverse rows, and a transverse conveyor comprising a plurality of steps adapted to move each line transversely in steps, as the containers advance, to discharge the containers from the conveyor.

3. In a machine of the character described, a moving conveyor adapted to transport a plurality of transverse rows of containers in substantially parallel lines, a transverse conveyor having reciprocating motion in a direction transverse to the first named conveyor from a retracted position to a forward position, said transverse conveyor comprising a pusher bar having a plurality of equal steps, and means to advance the transverse conveyor a predetermined number of lines to move each line and to discharge containers from said first mentioned conveyor in lines parallel to the lines thereon.

4. In a machine of the character described, a conveyor adapted to transport containers in a plurality of substantially parallel lines longitudinally of the conveyor, means attached to said conveyor and projecting thereabove to retain the containers in transverse rows, and a transverse conveyor comprising a plurality of steps adapted to move each line transversely in steps, as the containers advance, to discharge the containers from the conveyor.

5. In a machine of the character described, a moving conveyor adapted to transport a plurality of transverse rows of containers in substantially parallel lines, means on said conveyor to retain the containers in transverse rows, a transverse conveyor having reciprocating motion in a direction transverse to the first named conveyor from a retracted position to a forward position, said transverse conveyor comprising a pusher bar having a plurality of equal steps, and means to advance the transverse conveyor a predetermined number of lines to move each line and to discharge containers from said first mentioned conveyor in lines parallel to the lines thereon.

6. A conveyor system comprising a continuous conveyor adapted to convey a plurality of transverse rows of containers in substantially parallel lines longitudinal of the conveyor, a reciprocable pusher bar movable transversely to the direction of motion of the conveyor, said pusher bar comprising a plurality of steps all steps advancing the containers opposite those steps a predetermined number of lines transversely of the direction of motion of the conveyor on the forward stroke while permitting the advancing lines to fill the space vacated by the return movement of the pusher bar.

7. In a machine of the character described a moving conveyor adapted to transport a plurality of transverse rows of containers in substantially parallel lines, a transverse conveyor having reciprocating motion in a direction transverse to the first named conveyor from a retracted position to a forward position, said transverse conveyor comprising a pusher bar having a plurality of steps, and means to advance the transverse conveyor a predetermined number of lines to move each line and to discharge containers from said first mentioned conveyor in lines parallel to the lines thereon.

8. In a machine of the character described, a moving conveyor adapted to transport a plurality of transverse rows of containers in substantially parallel lines, means on said conveyor to retain the containers in transverse rows, a transverse conveyor having reciprocating motion in a direction transverse to the first named conveyor from a retracted position to a forward position, said transverse conveyor comprising a pusher bar having a plurality of steps, and means to advance the transverse conveyor a predetermined number of lines to move each line and to discharge containers from said first mentioned conveyor in lines parallel to the lines thereon.

References Cited in the file of this patent

UNITED STATES PATENTS

| | | |
|---|---|---|
| 986,483 | Messlin | Mar. 14, 1911 |
| 1,254,204 | Connor | Jan. 22, 1918 |
| 1,760,030 | Alger | May 27, 1930 |
| 1,871,676 | Ermold | Aug. 16, 1932 |
| 2,071,859 | Steiner | Feb. 23, 1937 |
| 2,090,129 | Kimball et al. | Aug. 17, 1937 |
| 2,358,292 | Malhiot | Sept. 12, 1944 |
| 2,526,983 | Wait | Oct. 24, 1950 |
| 2,649,231 | Ferguson | Aug. 18, 1953 |

FOREIGN PATENTS

| | | |
|---|---|---|
| 519,628 | Germany | Feb. 12, 1931 |